United States Patent
Kondoh

(10) Patent No.: US 7,454,594 B2
(45) Date of Patent: Nov. 18, 2008

(54) PROCESSOR FOR REALIZING SOFTWARE PIPELINING WITH A SIMD ARITHMETIC UNIT SIMULTANEOUSLY PROCESSING EACH SIMD INSTRUCTION ON A PLURALITY OF DISCRETE ELEMENTS

(75) Inventor: Yuki Kondoh, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 319 days.

(21) Appl. No.: 10/320,615

(22) Filed: Dec. 17, 2002

(65) Prior Publication Data
US 2003/0159022 A1    Aug. 21, 2003

(30) Foreign Application Priority Data
Feb. 15, 2002    (JP) ............................ P2002-039106

(51) Int. Cl.
*G06F 9/302* (2006.01)
(52) U.S. Cl. .................. 712/22; 712/210; 712/221
(58) Field of Classification Search .................. 712/22, 712/210, 221
See application file for complete search history.

(56) References Cited

U.S. PATENT DOCUMENTS 5,822,619 A * 10/1998 Sidwell ................. 712/300
6,122,725 A * 9/2000 Roussel et al. ........... 712/200

FOREIGN PATENT DOCUMENTS

| EP | 0 930 564 A1 | 4/1998 |
| JP | 50-43853 | 8/1973 |
| WO | WO 98/45774 | 4/1998 |

* cited by examiner

*Primary Examiner*—Eddie P Chan
*Assistant Examiner*—Robert E Fennema
(74) *Attorney, Agent, or Firm*—Reed Smith LLP; Stanley P. Fisher, Esq.; Juan Carlos A. Marquez, Esq.

(57) ABSTRACT

A processor and its arithmetic instruction processing method and arithmetic operation control method are disclosed that add a new operand designation option to SIMD arithmetic instructions and permit software pipelining between arithmetic operations performed in parallel by a SIMD arithmetic unit. A selector for adding an operation for interchanging multiple outputs of a SIMD arithmetic unit is added to a data path. A register file is divided in accordance with the output bit fields of the SIMD arithmetic unit. A means of specifying multiple registers as a SIMD instruction's output operand is added. Therefore, part of the output results of arithmetic operations performed in parallel by the SIMD arithmetic unit can be stored in a register providing the input for another arithmetic operation. Software pipelining is rendered achievable in this manner.

14 Claims, 10 Drawing Sheets

DADD Rm, Rn, Rd
DADD Rm, Rn, Rd1&Rd2

FIG. 8

| d | Rd1 | Rd2 | |
|---|---|---|---|
| 000000 | R0_H | R0_L | ⎫ |
| 000010 | R1_H | R1_L | ⎪ |
| 000100 | R2_H | R2_L | ⎬ 911 |
| . | . | . | ⎪ |
| 111110 | R63_H | R63_L | ⎭ |
| 111111 | R63_L | R1_H | ⎫ |
| 000001 | R0_L | R2_H | ⎪ |
| 000011 | R1_L | R3_H | ⎬ 912 |
| . | . | . | ⎪ |
| 111110 | R62_L | R0_H | ⎭ |

PROCESSOR FOR REALIZING SOFTWARE PIPELINING WITH A SIMD ARITHMETIC UNIT SIMULTANEOUSLY PROCESSING EACH SIMD INSTRUCTION ON A PLURALITY OF DISCRETE ELEMENTS

BACKGROUND OF THE INVENTION

1. Field of the Invention

The present invention relates to a processor used as a central processing unit of a computer and, more particularly, to a processor that uses a SIMD (Single Instruction Multiple Data) method for parallel processing of multiple arithmetic operations and the processor's arithmetic instruction processing method and arithmetic operation control method.

2. Description of the Related Art

The primary ways to enhance a processor's arithmetic performance s to increase its operating frequency or improve the arithmetic performance per cycle. The arithmetic performance of present-day processors generally is improved by enhancing a combination of these two elements.

The SIMD (Single Instruction Multiple Data) method is used to improve the arithmetic performance per cycle. The SIMD system is generally configured so that an arithmetic unit having a data width of (a) bits can be used as (m) arithmetic units having a data width of (b) bits (a=bm). The instructions supporting in the mode in which multiple arithmetic units are used are called SIMD instructions.

The SIMD instructions are described, for instance, in "Intel Architecture Software Developers Manual Volume 2: Instruction Set Reference" (Intel Corporation, 1999). One example is the PMULHUW instruction, which is described on pp. 3-522.

FIG. 1 shows a typical arithmetic unit data path that is based on the conventional SIMD method. In this example, the 64-bit SIMD adder 131 comprises two 32-bit adders. The reference numeral 101 indicates a register file for sixty-four 64-bit registers. Two-register read and one-register write operations can be performed simultaneously. Signal 111 provides read/write control of the register file 101. The reference numerals 121, 122, and 161 indicate flip-flops for 64 bits.

After the control signal 111 reads two values from the register file 101, the read values are input to flip-flops 121 and 122 in synchronism with a clock signal. Subsequently, the 32 high-order bits of flip-flops 121 and 122 are added by a SIMD adder 131, and then entered in the 32 high-order bits of flip-flop 161 in synchronism with a clock signal. At the same time, the 32 low-order bits of flip-flops 121 and 122 are added by the SIMD adder 131, and entered in the 32 low-order bits of flip-flop 161 in synchronism with a clock signal. The value entered in flip-flop 161 is written into the register file 101 by the control signal 111.

FIG. 2 shows the format of an addition instruction that is based on the conventional SIMD method. This instruction's mnemonic for an assembler is DADD Rm, Rn, Rd. Rm and Rn are input registers. Rd is an output register. Elements 201 through 206 compose a 32-bit instruction code. Elements 201 and 203 are 6-bit and 4-bit bit fields, respectively, and op codes. Element 206 is a 4-bit bit field, which is a reserved field. Elements 202, 204, and 205 are 6-bit bit fields. Elements 202 and 204 are operands that specify an input register. Element 205 is an operand that specifies an output register.

FIG. 3 shows the relationship between the values in bit fields 202, 204, and 205 and the registers to be specified. Row 301 shows a bit pattern written in an operand. Row 302 indicates an associated register. As stated above, the conventional SIMD method specifies an operand normally on an individual register basis.

The input/output register bit field position is fixed for all simultaneously performed arithmetic operations. Therefore, when the operand is determined for any one of the simultaneously performed arithmetic operations, the operands of the other arithmetic operations are automatically determined.

For example, in the performance of a process where the subscripts of arrays a[ ], b[ ], and c[ ] in the memory are added and then the result is stored in array s [ ], when such a process is written in C language, Equation (1) is obtained as follows:

$$\text{For } (i = 0; I < \text{MAX}; i{+}{+}) \qquad (1)$$
$$\{S[i] = a[i] + b[i] + c[i];\}$$

Next, the above process is performed with the conventional SIMD processor described above. Assume that a logical operation, shift operation, and addition operation cannot be performed in parallel. FIG. 4 shows a process that is performed using a software pipelining technique. Note that load/store operations performed relative to the memory are omitted. The reason is that the necessity for considering load/store operations can be eliminated by properly arranging instructions in situations where an arithmetic operation and load/store operation can be performed in parallel.

Each of the reference numerals 501 to 504 indicate one-clock-cycle The reference numerals 511 to 513 indicate 64-bit registers. These registers provide the input of an arithmetic operation performed on cycle 501. The reference numerals 521 to 523 indicate 64-bit registers. These registers receive the output of an arithmetic operation performed on cycle 501 and provide the input of an arithmetic operation to be performed on cycle 502. The reference numerals 531 to 533 indicate 64-bit registers. These registers receive the output of an arithmetic operation performed on cycle 502 and provide the input of an arithmetic operation to be performed on cycle 503. The reference numerals 541 to 543 indicate 64-bit registers. These registers receive the output of an arithmetic operation performed on cycle 502 and provide the input of an arithmetic operation to be performed on cycle 504. The reference numerals 551 to 553 indicate 64-bit registers. These registers receive the output of an arithmetic operation performed on cycle 504.

Registers 511, 521, 531, 541, and 551 do not separately exist. They represent the results of changes in the contents of the same register. In other words, the contents of the register sequentially change from 511 to 521 to 531 to 541 to 551 on cycles 501, 502, 503 and 504, respectively. The same holds true for a combination of registers 512, 522, 532, 542, and 552 and a combination of registers 513, 523, 533, 543, and 553.

The reference numerals 514 and 515 indicate adders. These are used as 32-bit adders, which are obtained by dividing a single 64-bit adder into two by the SIMD method. Adders 514 and 515 perform an arithmetic operation on cycle 501. The reference numerals 544 and 545 indicate adders. Adders 544 and 545 perform an arithmetic operation on cycle 504.

Adders 514 and 544 do not separately exist. They represent arithmetic operations that are performed respectively on cycles 501 and 504 by the same adder. The same holds true for a combination of adders 515 and 545. The reference numeral 524 indicates a 32-bit logical shifter, which performs an arithmetic operation on cycle 502. The reference numeral 534 indicates an arithmetic unit that performs a 64-bit OR operation on cycle 503.

On cycle 501, the addition processes for the "$i^{th}$" element and "$i-1^{th}$" element are simultaneously performed. On cycle 504, the addition processes for the "$i^{th}$" element and "$i+1^{th}$" element are simultaneously performed. The technique for processing different elements on the same cycle in this manner is called "software pipelining". On cycles 502 and 503, the 32 high-order bits of register 523, which represent adder 514's output on cycle 501, are moved to the 32 low-order positions of register 533 by the shifter 524, ORed with the contents of register 531, and stored in the 32 low-order bits of register 541.

When software pipelining is conducted by the conventional SIMD method, a[i+1] must be stored in the 32 high-order bits of register 541, which is input to adder 544, and the result of an arithmetic operation performed by adder 514 must be stored in the 32 low-order bits of register 541. However, the result of an arithmetic operation performed by adder 514 is always stored in the register's 32 high-order bits. As such being the case, the arithmetic operations performed on cycles 502 and 503 are required for moving the stored result to the 32 low-order bits. For such a purpose, three cycles are required per element. Therefore, it is obvious that the performance level is reduced to ⅓ the level prevailing during the aforementioned ideal status.

FIG. 5 shows a case where two elements are simultaneously processed by the conventional SIMD method but without using the software pipelining technique.

Each of the reference numerals 601 and 602 indicate one-clock-cycle. The reference numerals 611 to 613 indicate 64-bit registers. These registers provide the input of an arithmetic operation to be performed on cycle 601. The reference numerals 621 to 623 indicate 64-bit registers. These registers receive the output of an arithmetic operation performed on cycle 601 and provide the input of an arithmetic operation to be performed on cycle 602. The reference numerals 631 to 633 indicate 64-bit registers. These registers receive the output of an arithmetic operation performed on cycle 602.

Registers 611, 621, and 631 do not separately exist. They represent the results of changes in the contents of the same register. In other words, the contents of the register sequentially change from 611 to 621 to 631 on cycles 601 and 602. The same holds true for a combination of registers 612, 622, and 632 and a combination of registers 613, 623, and 633.

The reference numerals 614 and 615 indicate adders. These are used as 32-bit adders, which are obtained by dividing a single 64-bit adder into two by the SIMD method. Adders 614 and 615 perform an arithmetic operation on cycle 601. The reference numerals 624 and 625 indicate adders. Adders 624 and 625 perform an arithmetic operation on cycle 602.

Adders 614 and 624 do not separately exist. They represent arithmetic operations that are performed respectively on cycles 601 and 602 by the same adder. The same holds true for a combination of adders 615 and 625.

On cycle 601, the processes for the "$i^{th}$" element and "$i+1^{th}$" element of arrays a[ ] and b[ ] are simultaneously performed. On cycle 602, the processes for the result of cycle 601 and the "$i^{th}$" element and "$i+1^{th}$" element of array c[ ] are simultaneously performed. In this case, the attained performance is 1 cycle per element. However, it is not adequate because the number of registers required for processing is increased by ½. For example, registers 611, 621, and 631 are regarded here as physical registers, and arrays a[ ], b[ ], and c[ ] correspond to data stored in two logical registers in a physical register.

As described above, the actual performance of a SIMD processor may be lower than its peak performance when it performs certain types of processing operations. Performance deterioration occurs particularly when arithmetic operations comprising a process are interdependent and software pipelining is required. The peak performance can be maintained by simultaneously processing the "$i^{th}$" and "$i+1^{th}$" elements. However, such performance maintenance would make the required number of registers greater than in the ideal case since SIMD instructions do not provide a high degree of freedom in specifying input/output registers.

SUMMARY OF THE INVENTION

The present invention adds to and otherwise extends the output register designation functionality of the SIMD instructions and changes the SIMD arithmetic unit data path to implement such extended functionality. More specifically, the present invention makes it possible to output the results of SIMD arithmetic unit's arithmetic operations to a plurality of records, adds an operand designation option to SIMD instructions to permit storage in a section other than an input bit field, and provides a means of writing into segments of multiple registers.

The operand designation option of the present invention provides a more efficient means of storing the output of an adder in the 32 low-order bits of a register than can be obtained using conventional arithmetic processing and operation control methods.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 8 shows a table of registers that correspond to operand 805 of FIG. 7;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

Figure 6:
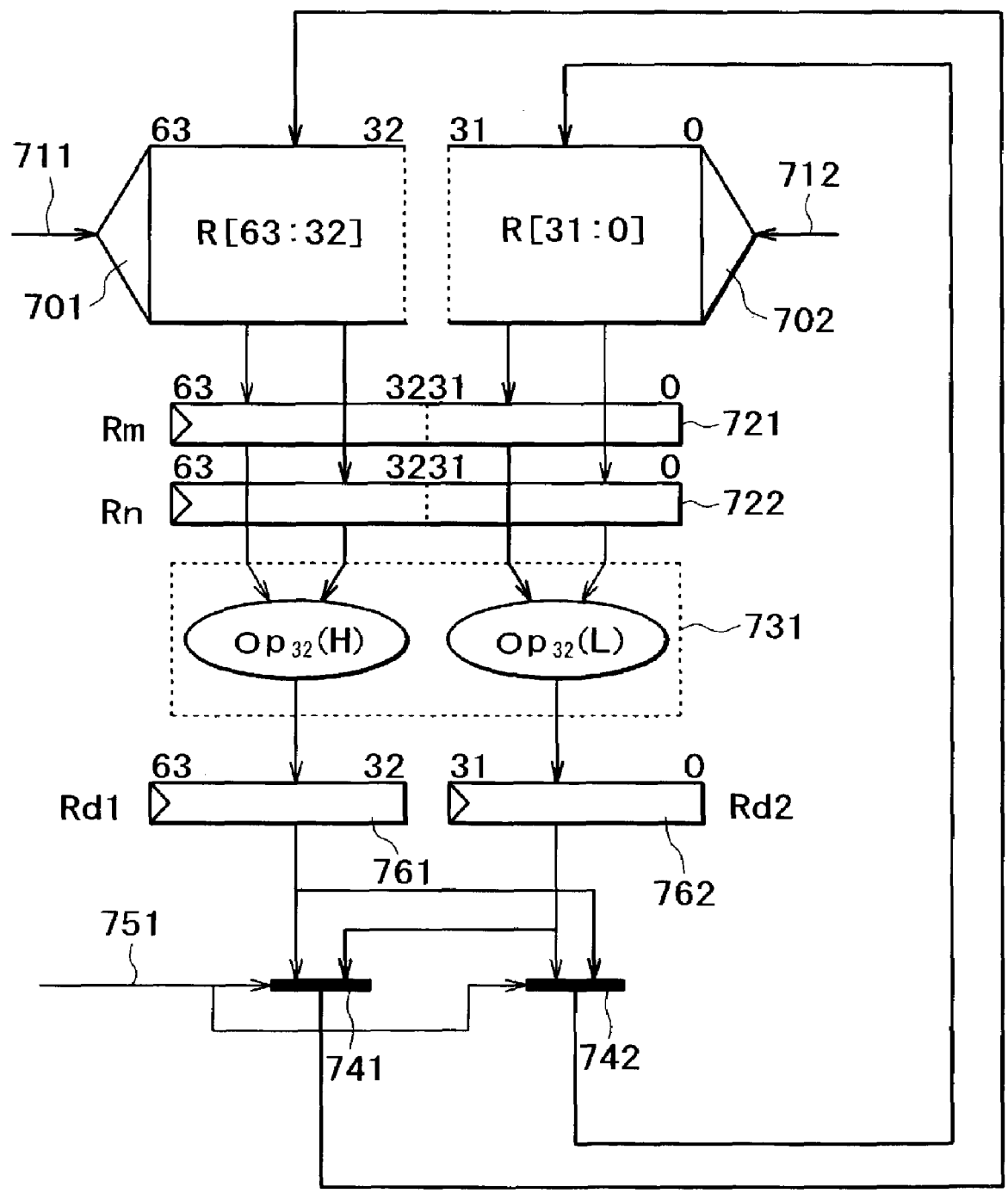
FIG. 6 illustrates an arithmetic unit data path according to a preferred SIMD method of the present invention.

FIG. 6 shows a SIMD arithmetic unit data path according to a preferred embodiment of the present invention. The reference numeral 731 indicates a 64-bit SIMD arithmetic unit, which is divided into two 32-bit arithmetic units. The reference numerals 701 and 702 indicate register files for 64 32-bit registers. These register files can simultaneously permit a two-register read operation and one-register write operation. The reference numerals 711 and 712 respectively indicate read control and write control signals for register files 701 and 702. The reference numerals 721 and 722 indicate flip-flops for 64 bits. The reference numerals 761 and 762 indicate flip-flops for 32 bits. The reference numerals 741 and 742 indicate 32-bit selectors. The reference numeral 751 indicates a signal that controls the output of the selectors 741 and 742.

Figure 1:
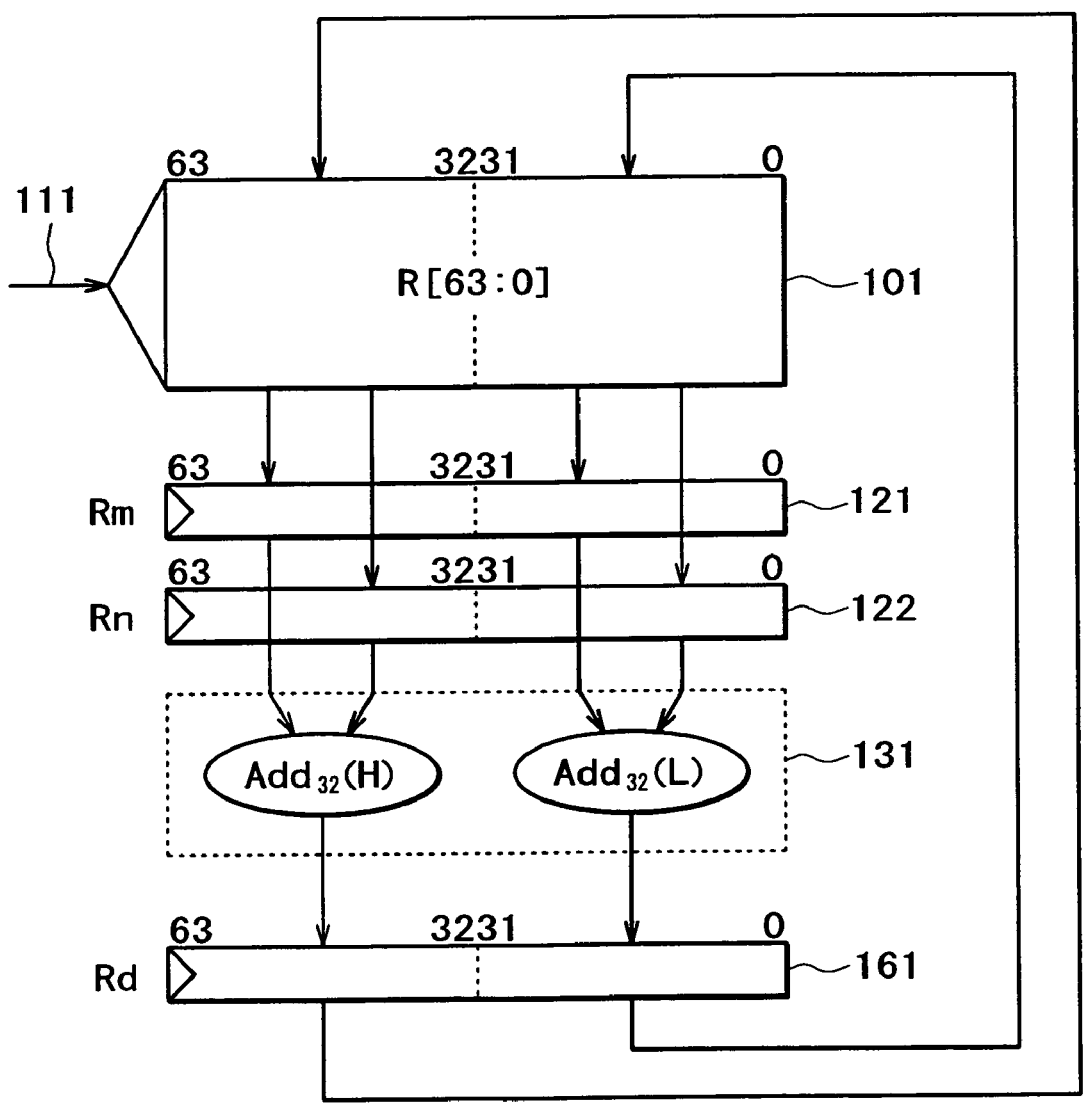
FIG. 1 illustrates an arithmetic unit data, path according to a conventional SIMD method.

When the same register is specified by the control signals 711 and 712, the operation of register files 701 and 702 is equivalent to that of conventional SIMD register file 101 (FIG. 1). More specifically, register file 701 stores data corresponding to the 32 high-order bits of register file 101 while register file 702 stores data corresponding to the 32 low-order bits of register file 101.

When compared with a conventional SIMD arithmetic unit data path, the present invention is characterized in that the register files are divided into a 32 high-order bit section 701 and 32 low-order bit section 702, and that the arithmetic unit data path is additionally provided with selectors 741 and 742 and selector control signal 751 for switching between the high-and low-order sections of the SIMD arithmetic unit output.

Two values read from register file 701 by control signal 711 are entered in the 32 high-order bits of flip-flops 721 and 722 in synchronism with a clock signal. Two values read from register file 702 by control signal 712 are entered in the 32 low-order bits of flip-flops 721 and 722 in synchronism with a clock signal.

Next, the 32 high-order bits of flip-flops 721 and 722 are calculated by a SIMD arithmetic unit 731 and this first result is stored in flip-flop 761. Further, flip-flop 761 enters the first result of the arithmetic operation in the selectors 741 and 742. At the same time, the 32 low-order bits of flip-flops 721 and 722 are calculated by the SIMD arithmetic unit 731 and this second result is stored in flip-flop 762. Further, flip-flop 762 enters the second result of the arithmetic operation in the selectors 741 and 742.

Subsequently, control signal 711 writes the first result of the arithmetic operation in register file 701 via selector 741. In addition, control signal 712 writes the second result of the arithmetic operation in register file 702 via selector 742. Alternatively, control signal 711 writes the second result of the arithmetic operation in register file 701 via selector 741 and control signal 712 writes the first result of the arithmetic operation in register file 702 via selector 742.

Figure 2:
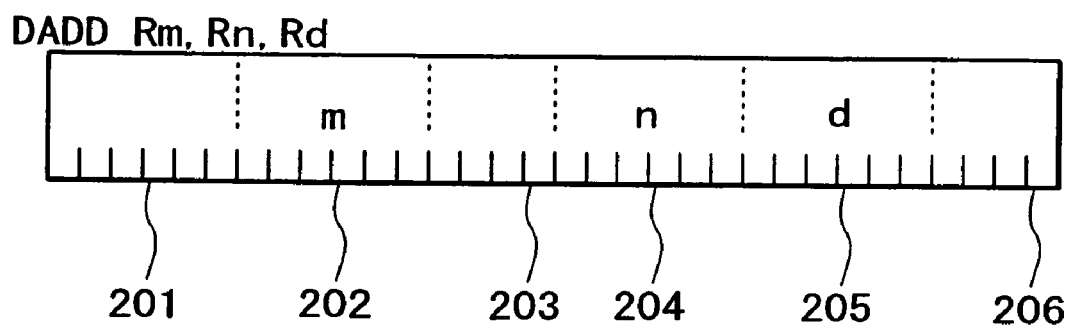
FIG. 2 shows a SIMD addition instruction format according to a conventional SIMD method.
Figure 3:
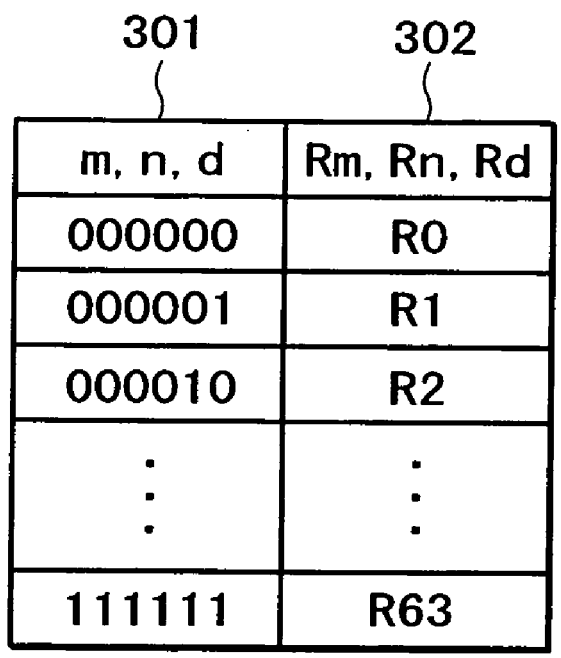
FIG. 3 shows a table of registers that correspond to operands 202, 204, and 205 of FIG. 2.
Figure 7:
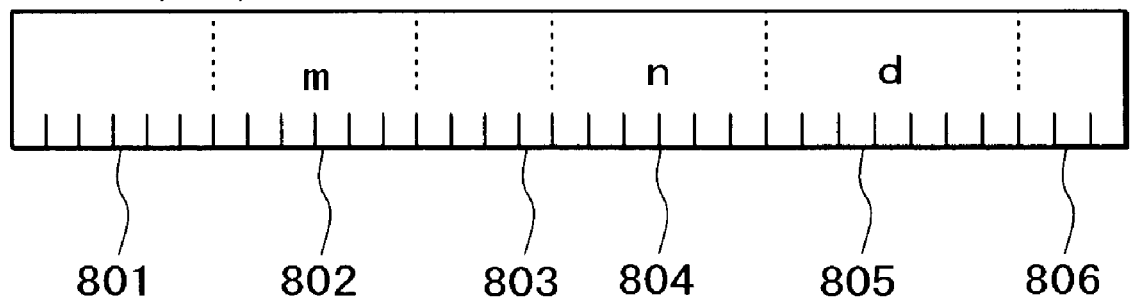
FIG. 7 shows a SIMD addition instruction format according to a preferred SIMD method of the present invention.

A preferred SIMD instruction according to the present invention is described immediately below. FIG. 7 shows the format of a preferred SIMD addition instruction of the present invention. This instruction's mnemonic for an assembler is DADD Rm, Rn, Rd or DADD Rm, Rn, Rd1 & Rd2. Rm and Rn are input registers. Rd, Rd1, and Rd2 are output registers. The latter type of instruction provides a preferred SIMD operation according to the present invention. Bit fields 801 to 806 correspond to bit fields 201 to 206 shown in FIG. 2.

More specifically, bit fields 801 and 803 have op codes. Bit field 806 is reserved. Bit fields 802 and 804 have operands for specifying an input register. Bit field 805 has an operand for specifying an output register.

Although bit field 205 is a 6-bit field, bit field 805 is a 7-bit field. Bit field 806 is a 3-bit field although bit field 206 is a 4-bit field. The relationship between the values in bit fields 802 and 804 and the registers to be specified is the same as with FIG. 2.

FIG. 8 shows the relationship between the value in bit field 805 and the registers to be specified. Row 901 shows a bit pattern written in an operand. Row 902 indicates a register that stores the result of the 32 high-order bits of SIMD arithmetic unit 731. Row 903 indicates the storage destination for the 32 low-order bits of SIMD arithmetic unit 731.

Regarding the lines within range 911, the 32 high-order bits of a register store the 32 high-order bits of the arithmetic operation result and the 32 low-order bits of the same register store the 32 low-order bits of the result. Rd1 and Rd2 in FIG. 6 are regarded as registers into which single register Rd is logically divided.

Therefore, selector 741 in FIG. 6 outputs the 32 high-order bits of the arithmetic operation result, whereas selector 742 outputs the 32 low-order bits of the arithmetic operation result. The control signals 711 and 712 for register files 701 and 702 specify the same write register.

Regarding the lines within range 912, the 32 high-order bits of the arithmetic operation result are output to register Rd1. The data contained in register Rd1 is to be stored in the 32 low-order bits of a register in register file 702 via selector 742. The 32 low-order bits of the arithmetic operation result are output to register Rd2. The data contained in register Rd2 is to be stored in the 32 high-order bits of a register owned by register file 701 via selector 741.

Therefore, selector 741 in FIG. 6 outputs the 32 low-order bits of the arithmetic operation result, whereas selector 742 outputs the 32 high-order bits of the arithmetic operation result. The control signals 711 and 712 for register files 701 and 702 specify different registers in accordance with write registers Rd1 and Rd2.

One preferred embodiment has been described above. In addition, the present invention also provides various other preferred embodiments as described below. In another preferred embodiment of the present invention, input register designation operands 802 and 804 are extended in the same manner as for output register designation operand 805 shown in FIG. 7 and without extending output register designation operand 805 so that certain portions of different registers are used as the input for the SIMD arithmetic unit.

Figure 4:
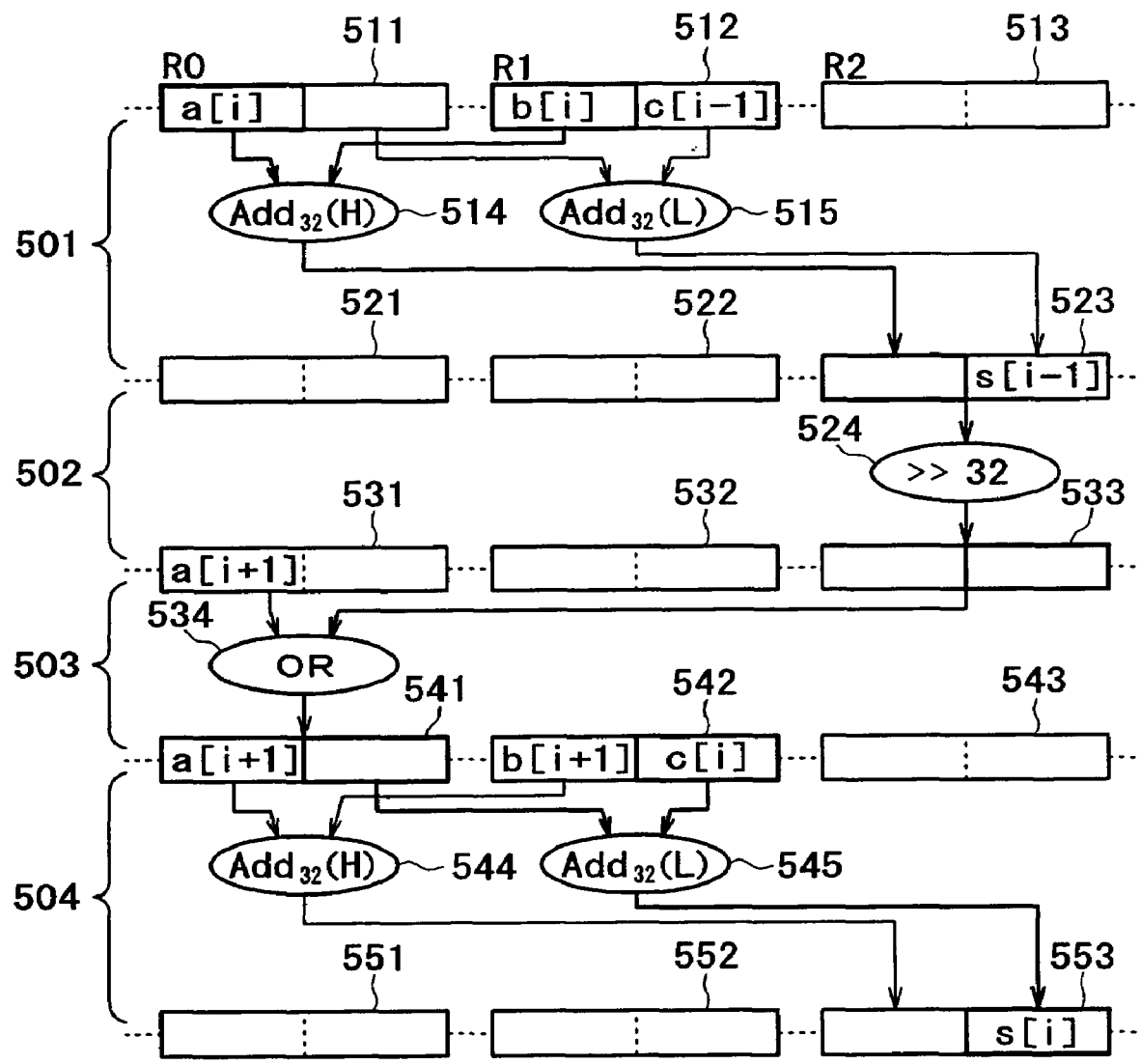
FIG. 4 illustrates a conventional SIMD process in which the software pipelining technique is used.
Figure 9:
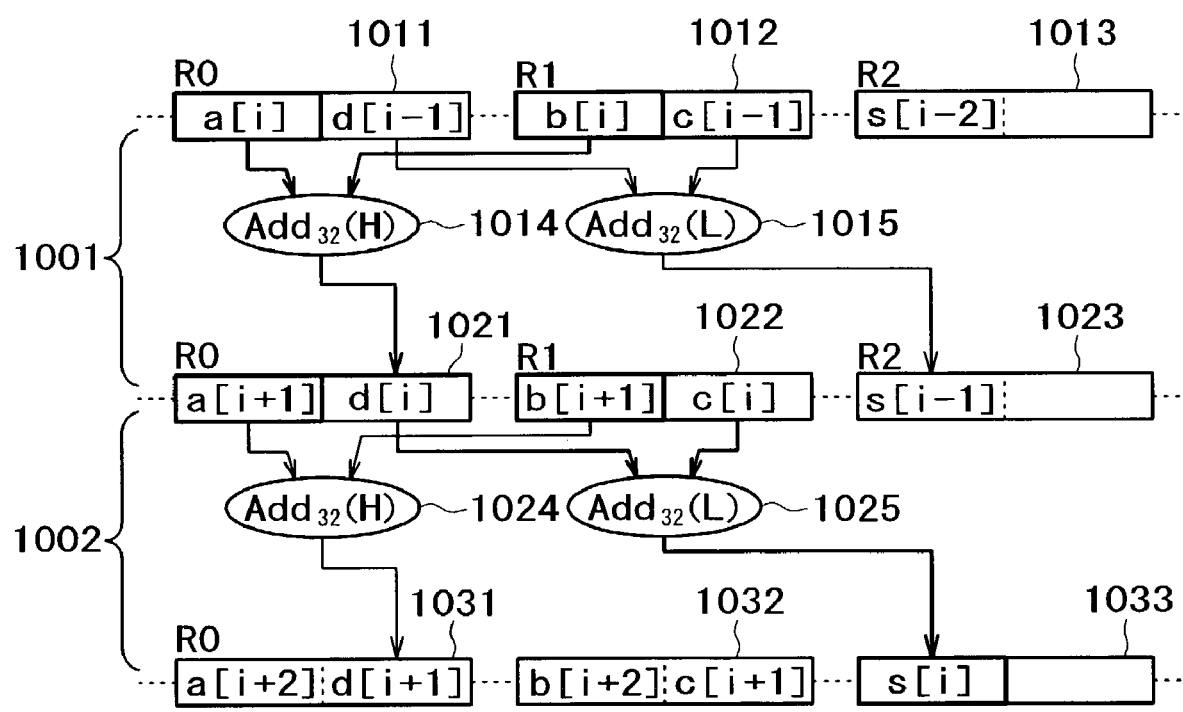
FIG. 9 illustrates a process where the software pipelining technique is used according to a preferred SIMD method of the present invention.

When the SIMD method of this preferred embodiment of the present invention is used to add the elements of arrays a[ ], b[ ], and c[ ] and store the result in array s[ ] as explained earlier, one instruction, such as "DADD R0, R1, R0_L&R2_H" can be looped as a processing routine instruction stream. This process is shown in FIG. 9. Note, however, that load/store operations are excluded from the figure because they need not be considered for the same reason stated above with respect to FIG. 4.

Each of the reference numerals 1001 and 1002 indicate one-clock-cycle. The reference numerals 1011 to 1013 indicate registers that provide the input of an arithmetic operation performed on cycle 1001. The reference numerals 1021 to 1023 indicate registers that receive the output of an arithmetic operation performed on cycle 1001 and provide the input of an arithmetic operation to be performed on cycle 1002. The reference numerals 1031 to 1033 indicate registers that receive the output of an arithmetic operation performed on cycle 1002. As previously described with reference to FIG. 4, registers 1011, 1021, and 1031 represent the results of changes in the contents of the same register. The same holds true for a combination of registers 1012, 1022, and 1032 and a combination of registers 1013, 1023, and 1033.

The reference numerals 1014 and 1015 indicate SIMD adders that perform an arithmetic operation on cycle 1001. The reference numerals 1024 and 1025 indicate adders that perform an arithmetic operation on cycle 1002. As previously described with reference to FIG. 4, adders 1014 and 1024 represent the same adder. The same holds true for a combination of adders 1015 and 1025.

In a process of the "$i^{th}$" element, a[i] is loaded into the high-order part of register 1011 with b[i] loaded into the high order part of register 1012, an addition operation is performed by adder 1014 on cycle 1001, and the result is stored in the low-order part of register 1021 as d[i]. Further, the c[i] value is loaded into the low-order part of register 1022, added by adder 1025 to d[i], which had been stored in the low-order part of register 1021, on cycle 1002, and the result is stored in the high-order part of register 1033 as S[i].

On cycle 1002, adder 1024 processes the "$i+1^{th}$" element in addition to "$i^{th}$" element processing. On cycle 1001, adder 1015 processes the "$i-1^{th}$" element in addition to "$i^{th}$" element processing. As a result, the preferred SIMD method of the present invention is capable of conducting software pipelining as described with reference to FIG. 4 but still process one element on each cycle.

Figure 10A:
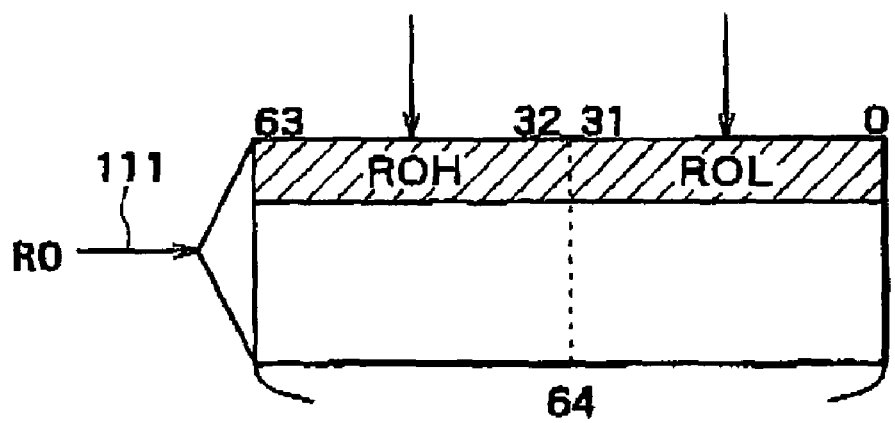
FIG. 10A illustrates an arithmetic operation result write operation that is performed in relation to a register file by a conventional SIMD method.
Figure 10B:
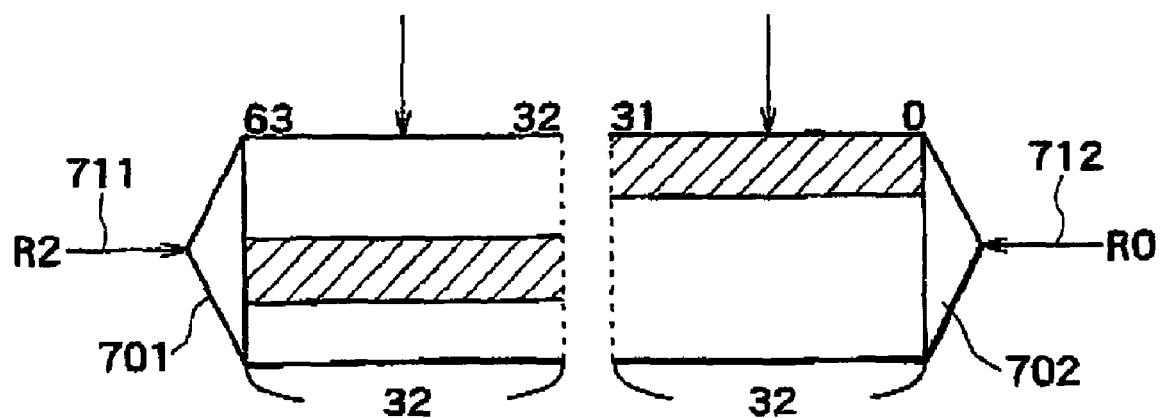
FIG. 10B illustrates an arithmetic operation result write operation that is performed in relation to a register file by a preferred SIMD method of the present invention.

FIG. 10B shows a detailed diagram of register files 701 and 702 in the processor configuration example of the preferred embodiment of the present invention shown in FIG. 6. The features and effects of the operation example of the present invention shown in FIG. 9 are described below with reference to the conventional operation example shown in FIG. 5 as well as to FIGS. 10A and 10B.

Figure 5:
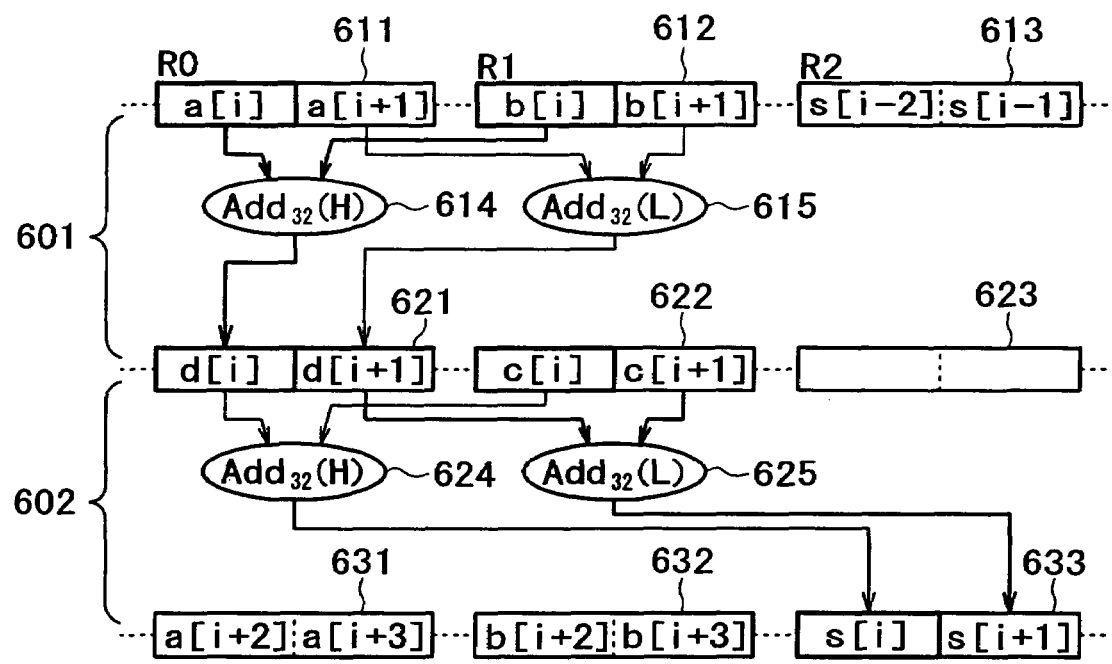
FIG. 5 illustrates a conventional SIMD process in which the software pipelining technique is not used.

When the conventional technology is used, it is necessary as shown in FIG. 5 that the result of addition of R0 register high-order bit a[i] and R1 register high-order bit b[i] be always stored in a high-order bit of R0 register as d[i] and that the result of addition of R0 register low-order bit a[i+1] and R1 register low-order bit b[i+1] be always stored in a low-order bit of R0 register as d[i+1]. That is why a control signal 111 carrying a write instruction for the R0 register writes the result of addition in high- and low-order bits of the R0 register as indicated in FIG. 10A.

In a preferred embodiment of the present invention, the result can be stored in a low-order bit of the R0 register as d[i] and in a high-order bit of the R2 register as S[i−1], as shown in FIG. 9, in accordance with a first control signal 711 for issuing a write instruction for R2 register high-order bit and a second control signal 712 for issuing a write instruction for R0 register low-order bit, as shown in FIG. 10B. In other words, the write destination register and its high-/low-order bit can be specified as desired by the input of the first control signal 711 and second control signal 712.

The features of a processor having SIMD instructions according to preferred embodiments of the present invention have been described. However, the processor described with respect to the preferred embodiments above can also be supplied as a processor that offers features (a) through (e) described below.

(a) A processor that comprises first to sixth registers, operates on data contained in a part of the first register and data contained in the associated part of the second register, has an instruction for operating on data contained in another part of the third register and data contained in an associated other part of the fourth register, operates on the aforementioned part of data and the aforementioned part of associated data upon execution of the instruction, stores the result of the first arithmetic operation in another part of the fifth register, operates on data in the other part and data in the associated other part, and stores the result of the second arithmetic operation in a part of the sixth register.

(b) The processor according to (a) above, wherein the first register is identical with the third register, the second register is identical with the fourth register, and the first register is identical with the fifth register.

(c) The processor according to (b) above, further comprising a first control signal and a second control signal, wherein the processor stores the result of the first arithmetic operation in another part of the fifth register in accordance with the input of the first control signal and stores the result of the second arithmetic operation in a part of the sixth register in accordance with the input of the second control signal.

(d) The processor according to (a) above, further comprising a first selector and a second selector, wherein the first selector and second selector are provided to establish a data path for storing the result of the first arithmetic operation or the second arithmetic operation in another part of the fifth register or in a part of the sixth register.

(e) The processor according to (a) above, further comprising a register file that is divided in accordance with bit fields where data in the aforementioned part and the aforementioned other part are stored.

In addition, a preferred processor of the present invention comprises features (i) through (iii), described below.

(i) A processor equipped with a plurality of registers, an arithmetic operation circuit, a plurality of control signals, a first input flip-flop, a second input flip-flop and a plurality of output flip-flops, further comprising the steps of operating on data in a part of the first input flip-flop, which is entered from a register from one of the plurality of registers, and data in an associated part of the second input flip-flop, which is entered from another register, in accordance with an arithmetic instruction in the arithmetic operation circuit, and storing the result of the above arithmetic operation in a section other than the associated part of the register upon input of one of the control signals.

(ii) The processor according to (i) above, wherein the aforementioned arithmetic instruction is an addition instruction, and further comprising the steps of operating on data in another part of the first input flip-flop and data in an associated other part of the second input flip-flop in accordance with an arithmetic instruction in the arithmetic operation circuit, and storing the result of the above arithmetic operation in the associated part of the register in accordance with the input of the remaining one of the control signals.

(iii) The processor according to (ii) above, further comprising a first selector and a second selector, wherein the result of the above arithmetic operation contains the results of first and second arithmetic operations, and the first selector and second selector are provided to establish a data path for storing the result of the first arithmetic operation or the second arithmetic operation in the associated part of the register or in a section other than the associated part of the register.

The present invention may also preferably comprise a processor's arithmetic instruction processing method having features (1) and (2) below as an arithmetic processing method based on arithmetic instructions in a processor described above.

(1) An arithmetic instruction processing method used in a processor comprising a plurality of registers. The method comprises the steps of operating on data in a part of first input flip-flop, which is entered from one of the aforementioned registers and data in an associated part of second input flip-flop, which is entered from another register, and storing the result of the above arithmetic operation in a part other than the associated part of an output register.

(2) The arithmetic instruction processing method according to (1) above, further comprising the steps of operating on data in another part of the first input flip-flop and data in an associated other part of the second input flip-flop, and storing the result of the above arithmetic operation in the associated part of one of the registers.

The present invention may also provide an arithmetic operation control method having features (I) and (II) below as a method of controlling arithmetic operations in accordance with arithmetic instructions in a preferred processor of the present invention described above.

(I) An arithmetic operation control method used in a processor comprising first to sixth registers and having a first control signal, a second control signal, and an arithmetic instruction. The method comprises the steps of operating on data contained in a part of the first register and data contained in an associated part of the second register upon execution of the arithmetic instruction, and storing the result of the above arithmetic operation in a data section in a lower part of the fifth register upon input of the first control signal or second control signal.

(II) The arithmetic operation control method according to (I) above, wherein the above arithmetic instruction is an addition instruction, and further comprising the steps of operating on data in another part of the third register and data in an associated other part of the fourth register upon execution of the addition instruction, and storing the result of the above arithmetic operation in a data section in a higher part of the sixth register upon input of the first control signal or second control signal.

A processor having SIMD instructions of the present invention provides a means of adding to and otherwise extending the output register designation functionality of the SIMD instructions and changing the SIMD arithmetic unit data path to implement such extended functionality. As a result, the present invention makes it possible to write into various sections of a plurality of registers. The present invention also permits effective software pipelining, thereby enhancing the processor's arithmetic performance.

The foregoing invention has been described in terms of preferred embodiments. However, those skilled in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A processor comprising:
   a plurality of registers, each of said registers comprising only one first part and only one second part, said first part registering high-order bits and said second part registering low-order bits; and
   an arithmetic unit performing a first arithmetic operation on data from the first parts of said plurality of registers, and a second arithmetic operation on data from the second parts of said plurality of registers according to a SIMD instruction, simultaneously, the arithmetic unit with a data width of (a) bits being used as a plurality of (b)-bit arithmetic units to simultaneously process the SIMD instruction on a plurality of discrete elements in each of the (b)-bit arithmetic units respectively, (a) and (b) being positive integers, and (a) being a multiple of (b),
   wherein the SIMD instruction comprises an operand that designates, independently and respectively, only the first part of one of the plurality of registers to store a result of the first arithmetic operation and only the second part of another one of the plurality of registers to store a result of the second arithmetic operation, and
   wherein said processor stores the result of said first arithmetic operation into said only one of the first parts of said plurality of registers according to the operand of the SIMD instruction and the result of the second arithmetic operation into said only one of the second parts of the plurality of registers according to the operand of the SIMD instruction.

2. The processor according to claim 1, wherein the operand designates whether to store the results of the first and second arithmetic operations in two different registers.

3. The processor according to claim 1, further comprising a first selector and a second selector, wherein said first and second selectors are provided to establish data paths for storing the results of said first and second arithmetic operations according to the operand of the SIMD instruction.

4. The processor according to claim 1, wherein each of said registers consists of the first part and the second part.

5. An arithmetic instruction processing method used in a processor comprising a plurality of registers each of which includes only one first part and only one second part, said first part registering high-order bits and said second part registering low-order bits, said method comprising the steps of:
   providing an arithmetic unit with a data width of (a) bits being used as a plurality of (b)-bit arithmetic units to simultaneously process a SIMD instruction on a plurality of discrete elements in each of the (b)-bit arithmetic units respectively, (a) and (b) being positive integers, and (a) being a multiple of (b);
   performing a first arithmetic operation on data in the first parts of said plurality of registers and a second arithmetic operation on data in the second parts of said plurality of registers with the arithmetic unit, the first arithmetic operation and the second arithmetic operation being performed according to the SIMD instruction simultaneously;
   executing operations according to the SIMD instruction, the SIMD instruction comprising an operand that designates, independently and respectively, only the first part of one of the plurality of registers to store a result of the first arithmetic operation and only the second part of another one of the plurality of registers to store a result of the second arithmetic operation; and storing the result of said first arithmetic operation into said only one of the first parts of said plurality of registers and the result of the second arithmetic operation into said only one of the second parts of the plurality of registers according to the operand of the SIMD instruction.

6. The arithmetic operation control method according to claim 5, wherein each of said registers consists of the first part and the second part.

7. The arithmetic operation control method according to claim 5, wherein the operand designates whether to store the results of the first and second arithmetic operations in different registers.

8. The arithmetic operation control method according to claim 5, wherein said first arithmetic instruction is an addition instruction.

9. A processor equipped with a plurality of registers, an arithmetic operation circuit, a plurality of control signals, a first input flip-flop, a second input flip-flop, and a plurality of output flip-flops, wherein each of said plurality of registers comprises only one first part and only one second part, said first part registering high-order bits and said second part registering low-order bits, the arithmetic operation circuit performs a first arithmetic operation on data from the first parts of said plurality of registers, and a second arithmetic operation on data from the second parts of said plurality of registers according to a SIMD instruction, simultaneously, the arithmetic unit has a data width of (a) bits being used as a plurality of (b)-bit arithmetic units to simultaneously process the SIMD instruction on a plurality of discrete elements in each of the (b)-bit arithmetic units respectively, (a) and (b) being positive integers, and (a) being a multiple of (b), and wherein said processor stores a result of said first arithmetic operation into only the first part of one of the plurality of registers according to the operand of the SIMD instruction and a result of the second arithmetic operation into only the second part of another one of the plurality of registers as designated, independently and respectively, by the operand of the SIMD instruction.

10. The processor according to claim 9, wherein said first arithmetic instruction is an addition instruction.

11. The processor according to claim 1, wherein the operand designates to store the results of the first and second arithmetic operations into two different registers.

12. The arithmetic operation control method according to claim 5, wherein the operand designates to store the results of the first and second arithmetic operations into two different registers.

13. The processor according to claim 9, wherein the operand designates to store the results of the first and second arithmetic operations into two different registers.

14. The processor according to claim 9, wherein each of said registers consists of the first part and the second part.

* * * * *